Figure 1:
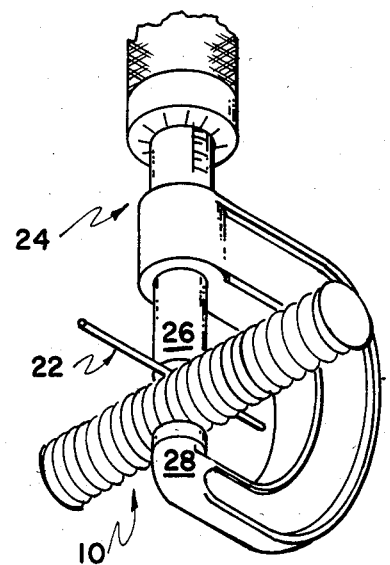

United States Patent [19]

Arredondo

[11] Patent Number: 4,590,678

[45] Date of Patent: May 27, 1986

[54] TECHNIQUE FOR DETERMINING THREAD ACCURACY

[76] Inventor: Alonso Arredondo, 4510 Christie, Corpus Christi, Tex. 78415

[21] Appl. No.: 677,238

[22] Filed: Dec. 3, 1984

[51] Int. Cl.$^4$ ............................ G01B 5/08; G01B 5/16
[52] U.S. Cl. ...................................... 33/199 R; 33/167
[58] Field of Search ................. 33/147 M, 167, 199 R

[56] References Cited

U.S. PATENT DOCUMENTS

| | | | |
|---|---|---|---|
| 2,543,012 | 2/1951 | Glanzer | 33/199 R |
| 2,731,730 | 1/1956 | Kraushaar | 33/199 R |
| 2,741,035 | 4/1956 | Pierce | 33/199 R |
| 2,817,153 | 12/1957 | Jakubiak | 33/199 R |
| 2,962,817 | 12/1960 | Varney et al. | 33/199 R |
| 3,068,582 | 12/1962 | Crossley | 33/199 R |

FOREIGN PATENT DOCUMENTS

| | | | |
|---|---|---|---|
| 903632 | 2/1954 | Fed. Rep. of Germany | 33/147 M |
| 667185 | 10/1929 | France | 33/167 |
| 595262 | 12/1947 | United Kingdom | 33/167 |

OTHER PUBLICATIONS

*Popular Science*, "Three-Wire Thread Measurement", Apr. 1944, p. 172.

*Primary Examiner*—Richard R. Stearns
*Attorney, Agent, or Firm*—G. Turner Moller

[57] ABSTRACT

In order to check threads for accuracy, a single wire is placed in the notch formed by the thread flanks. The wire is sized to extend above the top of the thread crown or ridge. A micrometer is used to measure the distance between the exposed top of the wire on one side of the thread and the thread crown on the other side. This technique is an improvement over the conventional three wire system since far less manual dexterity is required.

1 Claim, 2 Drawing Figures

U.S. Patent    May 27, 1986    4,590,678

TECHNIQUE FOR DETERMINING THREAD ACCURACY

This invention relates to a method and apparatus for determining whether the threads of threaded fasteners are machined to the desired tolerances.

The standard technique for determining whether the threads are to a desired tolerance is called the three wire method. In this method, three wires of the same predetermined size are placed in the thread grooves, two of the wires on one side of the fastener in adjacent grooves and the third wire on the opposite side of the fastener. The wires are of sufficient size to extend beyond the crown or peak of the threads. A micrometer is used to measure the distance from the radially outer edge of the single wire to the radially outer edges of the pair of wires. This technique is often referred to as measuring the pitch diameter of the threads since the wires are sized, when the thread is properly cut, to tangentially engage the thread flanks at the pitch diameter. This is somewhat misleading to a layman since the distance recorded by the micrometer is not the pitch diameter. Indeed, an ordinary micrometer cannot measure pitch diameter since the pitch diameter is smaller than the thread diameter. In accordance with standard computation techniques used by machinists, the pitch diameter is never calculated. Instead, the machinist used the following equation:

$$M = D + 3W - (1.5155/N)$$

where M is the distance measured by the micrometer over the wires, D is the major diameter of the threaded fastener, W is the diameter of the wire being used and N is the number of threads per inch. When the distance M over the wires is larger than the calculated values of $D + 3W - (1.5155/N)$, the machinist makes another pass and removes more metal from the threads. When the measured valued equals or comes very close to the calculated value, the machinist knows that the threads are to specification and terminates machining.

TABLE I

| Threads per inch | Wire Size | Add | Const |
|---|---|---|---|
| 48 | .018 | .02243 | .03596 |
| 40 | .018 | .01611 | .03235 |
| 32 | .024 | .02464 | .04494 |
| 24 | .029 | .02385 | .05092 |
| 18 | .032 | .01180 | .04789 |
| 14 | .040 | .01175 | .05814 |

In using this table, the calculated pitch diameter CPD is the major diameter MD plus the decimal in the "add" column minus the decimal in the "const" column. The measured pitch diameter MPD is the distance M over the wires less the decimal in the "const" column.

The main difficulty with the three wire method is that it requires considerable manual dexterity since the user must hold the bolt, three wires and a micrometer in appropriate relationship while being able to turn the micrometer handle. Trainee machinist find the technique loathsome. Even experienced machinists find it arkward and time consuming since the wires get dropped and the like.

There is accordingly a need for a simplified method of determining whether threads are cut to specifications. Presumably in response to such need, there have been developments such as is illustrated in U.S. Pat. No. 2,731,730. In this disclosure, a solid member of equilateral triangular shape has its apex placed adjacent the flanks of a notch formed between adjacent threads. The base of the equilateral triangular member extends beyond the thread crowns so that a micrometer may be used to measure the distance from the base of the triangle, on one side of the threaded member, to the major diameter of the thread on the opposite side of the threaded member. A somewhat similar, though simpler, equation is used in much the same manner as the three wire equation to determine whether the threads are cut to specification. The great virtue of this device is simplicity. Only one size triangle is needed since the angle between the sides of the triangle is 60° which is the same angle as between thread flanks of American standard screws. There is one technical difficulty with this device. Since the edges of the triangular device engage the thread flanks throughout a substantial length, any imperfection in the surface of the flanks generates an error in the micrometer reading which is all out of proportion to the seriousness of the imperfection. For example, if the flank had a small protrusion, the triangular member sits up too high in the thread notch thereby giving an erroneously large reading even if the pitch diameter were otherwise exactly correct. Consequently, the machinist will continue cutting on the thread until the proper reading is obtained thereby causing an overlarge and therefore imperfect thread.

Another disclosure which is superficially pertinent to this invention is found in U.S. Pat. No. 2,817,153. This device discloses a single wire system of determining whether threads are machined to tolerances. Instead of measuring some value which is related to pitch diameter, this device is evidently used to determine whether the flats at the crown of the thread are appropriately sized. A careful reading of this disclosure reveals that the micrometer is measuring the major diameter of the threads and the wire does not extend above the thread crown. It will accordingly be seen that this device does not, and cannot measure a thread feature which is related to pitch diameter.

A disclosure of a three wire device is found in U.S. Pat. No. 2,741,035.

In this invention, a single wire of predetermined selected size is placed in the notch defined by the thread flanks. The wire is of sufficient diameter to extend above the tops of the thread crowns. A micrometer is placed over the threaded fastener and wire so that the micrometer anvil engages the thread crowns on one side of the fastener and the micrometer spindle engages the wire. The anvil and spindle are advanced relatively toward each other into a measuring position. The measured value is compared to a calculated value to determine how closely the threads are to specification. The necessary calculations are of the same order of complexity as in the three wire method. Since there is only one wire used, it will be evident that the degree of manual dexterity required is far less with the one wire system.

It is accordingly an object of this invention to provide an improved technique for determining whether threads are to specification.

Another object of this invention is to provide an improvement over the prior art three wire method of checking threads.

Other objects and advantages of this invention will become more fully evident as this description proceeds, reference being made to the accompanying drawing and appended claims.

IN THE DRAWING

Figure 2:
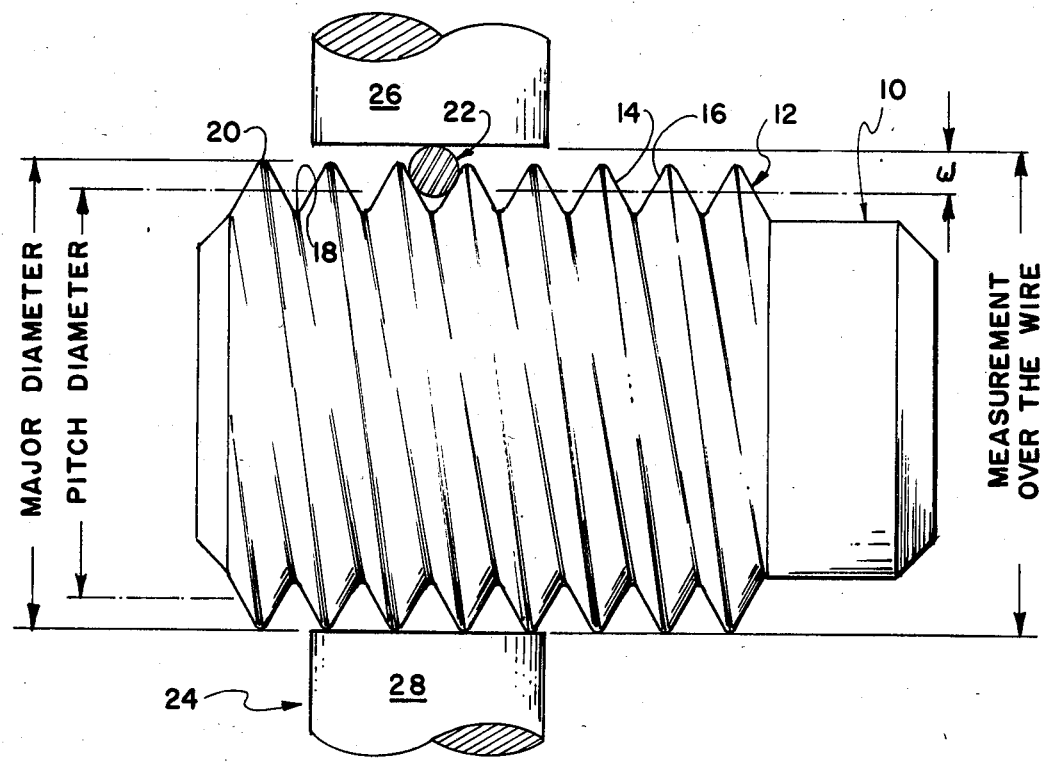

FIG. 1 is an isometric view of a threaded fastener, micrometer and wire in accordance with the principles of this invention; and FIG. 2 is an enlarged view of the arrangement of FIG. 1.

Referring to the drawing, a conventional threaded fastener or member 10 includes a screw thread 12 of conventional configuration having straight or flat sides or flanks 14, 16 which define a 60° angle with each other as well as with the longitudinal axis of the screw. Although the screw thread 12 is illustrated as having a rounded or flat root 18 and rounded or flat crest or crown 20, the gauge of this invention works equally well where the thread flanks 14, 16 include sharp corners at the root or crest.

As will be more fully evident as this description proceeds, the one wire method of this invention is applicable to other than American Standard Threads which include a 60° angle between the thread flanks 14, 16. For other types of threads, different sized wires and some adjustments will have to be made in the values provided in Table III.

The gauge or single wire 22 of this invention comprises a length of wire of circular cross-section of a predetermined selected diameter which is sufficient to engage the thread flanks 14, 16 tangentially at the pitch diameter and to project above the tops of the thread ridge or crown 20. The size wire that is used in the technique of this invention varies in accordance with the number of threads per inch as shown in Table II, as follows:

TABLE II

WHICH WIRE TO USE

| Threads/Inch | Wire Diameter, Inches |
|---|---|
| 32 | .0180 |
| 28 | .0206 |
| 24 | .0240 |
| 20 | .0289 |
| 18 | .0321 |
| 16 | .0361 |
| 14 | .0412 |
| 13 | .0444 |
| 12 | .0481 |
| 11 | .0525 |
| 10 | .0577 |
| 9 | .0641 |
| 8 | .0722 |

It will be evident that relationship between the wire diameter W and the number of threads/inch N is that $W \times N = 0.577$.

The measured length over the wire of a perfect thread varies, of course, with the major diameter of the threaded member, the size of the wire and the number of threads per inch. This variation is somewhat different than with the three wire method and may be expressed as $$M = D + 0.75W - (0.32475/N)$$

where M is the distance measured by the micrometer over the wire, D is the major diameter of the threaded fastener or member, W is the diameter of the wire being used and N is the number of threads per inch.

From this equation, a table may be generated to allow easy use by a machinist, as follows:

TABLE III (For 60 degree included angle Standard American National and Unified thread forms.)

| THREAD SIZES | WIRE SIZE | MICROMETER READING OVER ONE WIRE, INCHES |
|---|---|---|
| 10-24 | .0240 | .1945 |
| 10-32 | .0180 | .1934 |
| 12-24 | .0240 | .2205 |
| 12-28 | .0206 | .2199 |
| 1/4-20 | .0289 | .2554 |
| 1/4-28 | .0206 | .2539 |
| 5/16-18 | .0321 | .3185 |
| 5/16-24 | .0240 | .3170 |
| 3/8-16 | .0361 | .3818 |
| 3/8-24 | .0240 | .3795 |
| 7/16-14 | .0412 | .4452 |
| 7/16-20 | .0289 | .4429 |
| 1/2-13 | .0444 | .5083 |
| 1/2-20 | .0289 | .5054 |
| 9/16-12 | .0481 | .5715 |
| 9/16-18 | .0321 | .5685 |
| 5/8-11 | .0525 | .6349 |
| 5/8-18 | .0321 | .6310 |
| 3/4-10 | .0577 | .7608 |
| 3/4-16 | .0361 | .7568 |
| 7/8-9 | .0641 | .8870 |
| 7/8-14 | .0412 | .8827 |
| 1-8 | .0722 | 1.0136 |
| 1-12 | .0481 | 1.0090 |

Those skilled in the art will recognize the numbers under the column entitled "Thread Sizes" to be a statement both of the major diameter of the thread and a statement of the number of threads per inch. For example, the notation "¼-20" means that this fastener has a major diameter of ¼ inches and has 20 threads per inch. The second column of this table shows the size wire that is to be used with the selected thread size. The third column is the numerical reading that one should read off of the micrometer when the threads are to tolerance.

When using the one wire technique, the machinist selects a wire corresponding to the size thread that he is cutting. For example, using the ¼ inch by 20 threads per inch thread, the machinist selects the wire that is 0.0289 inches in diameter, see Table II. The machinist places the wire as shown in FIGS. 1 and 2 and manipulates the micrometer 24 so that the wire 22 and thread 12 are captivated between the anvil 28 and spindle 26. The measurement is taken off the micrometer. If the measured value is larger than 0.2554 inches as shown in the last column of Table III, the thread is too large and additional metal must be taken off of the thread to reach specifications.

It will accordingly be evident to those skilled in the art that there is herein provided an improved technique for determining whether threads are accurately formed, which requires calculations of comparable complexity to the prior art and which is far simpler to use and to teach to trainee machinists.

Although the invention has been described in its preferred forms with a certain degree of particularity, it is understood that the present disclosure is only by way of example and that numerous changes in the details of construction and in the combination and arrangement of parts may be resorted to without departing from the spirit and scope of the invention as hereinafter claimed.

I claim:

1. A method of determining, with a hand held micrometer of the type having an anvil, a spindle, a mechanism for manuipulating the spindle relative to the anvil and means for displaying the distance between the anvil and spindle, whether the threads of a threaded member are to tolerance, the threads comprising a root, a crest and a pair of flanks connecting the root and crest and defining therebetween an acute angle, the method comprising selecting a single wire of circular cross-sectional size as a function of the number of threads per unit length of the threaded member in accordance with the relationship wherein W×N is substantially constant, W is the wire diameter and N is the number of threads per unit length of the threaded member; placing the single wire in tangential engagement with the flanks of the thread at the pitch diameter, the wire being of sufficient size to extend above the top of the thread crest; placing the threaded member and wire in the hand held micrometer with the anvil and spindle engaging the wire on one side and the thread crest on the other side and measuring the distance between the thread crest and the edge of the wire extending above the top of the thread crest; and comparing the measured distance to a calculated value M wherein M=D+0.75W−0.32475/N wherein D is the major diameter of the threaded member, W is the wire diameter and N is the number of threads per unit length of the threaded member.

* * * * *